US010625780B2

(12) United States Patent
Mardh et al.

(10) Patent No.: US 10,625,780 B2
(45) Date of Patent: Apr. 21, 2020

(54) APPARATUS AND METHOD FOR DRIVER ACTIVITY DEPENDENT ADAS WHEEL ANGLE CONTROLLER

(71) Applicant: VOLVO CAR CORPORATION, Gothenburg (SE)

(72) Inventors: Lars Johannesson Mardh, Torslanda (SE); Malin Haglund, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 129 days.

(21) Appl. No.: 15/888,879

(22) Filed: Feb. 5, 2018

(65) Prior Publication Data
US 2018/0265128 A1 Sep. 20, 2018

(30) Foreign Application Priority Data
Mar. 20, 2017 (EP) .................................... 17161786

(51) Int. Cl.
*B62D 15/02* (2006.01)
*B62D 1/28* (2006.01)
*B62D 6/00* (2006.01)

(52) U.S. Cl.
CPC ........... *B62D 15/025* (2013.01); *B62D 1/286* (2013.01); *B62D 6/007* (2013.01)

(58) Field of Classification Search
CPC ....... B62D 15/025; B62D 1/286; B62D 6/007
See application file for complete search history.

(56) References Cited

U.S. PATENT DOCUMENTS

| 5,270,708 A | 12/1993 | Kamishima |
| 5,295,082 A | 3/1994 | Chang et al. |
| 5,765,116 A * | 6/1998 | Wilson-Jones ...... B62D 15/025 |
| | | 180/168 |

(Continued)

FOREIGN PATENT DOCUMENTS

| EP | 1291227 A2 | 3/2003 |
| EP | 2159777 A2 | 3/2010 |
| EP | 3106367 A1 | 12/2016 |

OTHER PUBLICATIONS

European Patent Office, Extended European Search Report for European Application No. 17155512.1-1755, dated Jul. 6, 2017, 5 pages.

(Continued)

*Primary Examiner* — Tyler J Lee
(74) *Attorney, Agent, or Firm* — Brooks Kushman P.C.

(57) ABSTRACT

A steer torque manager for an advanced driver assistance system of a road vehicle and a method therefor. The steer torque manager includes a driver in the loop functionality for determining when to hand over control to a driver, and a wheel angle controller for providing, from an advanced driver assistance system wheel angle request, an overlay torque request to be added to a torque request from an electrical power assisted steering. The steer torque manager is configured to receive an assistance torque related signal and arranged to scale, in a scaling functionality the bandwidth of the wheel angle controller based on a measure of driver activity, such that the bandwidth is reduced if the measure of driver activity indicates high driver activity and increased if the measure of driver activity indicates low driver activity.

19 Claims, 5 Drawing Sheets

(56) References Cited

U.S. PATENT DOCUMENTS

| | | | | |
|---|---|---|---|---|
| 6,053,270 | A * | 4/2000 | Nishikawa | B60R 21/2037 180/168 |
| 6,178,365 | B1 * | 1/2001 | Kawagoe | B62D 1/286 180/167 |
| 6,487,501 | B1 * | 11/2002 | Jeon | B62D 15/025 180/167 |
| 6,879,896 | B2 * | 4/2005 | Martens | B60K 28/16 180/271 |
| 8,118,126 | B2 * | 2/2012 | Rattapon | B62D 1/286 180/168 |
| 8,121,760 | B2 * | 2/2012 | Ghoneim | B62D 5/008 701/42 |
| 8,392,064 | B2 * | 3/2013 | Thrun | B62D 15/025 701/41 |
| 9,002,579 | B2 | 4/2015 | Kataoka | |
| 9,156,464 | B2 * | 10/2015 | Schuberth | B62D 5/008 |
| 9,428,219 | B2 | 8/2016 | Flehmig et al. | |
| 9,499,202 | B2 * | 11/2016 | Lewis | B62D 5/043 |
| 9,586,619 | B1 | 3/2017 | Akatsuka et al. | |
| 9,731,755 | B1 | 8/2017 | Moshchuk et al. | |
| 10,464,603 | B2 | 11/2019 | Mardh et al. | |
| 2001/0020902 | A1 | 9/2001 | Tamura | |
| 2002/0194016 | A1 | 12/2002 | Moribe et al. | |
| 2003/0045982 | A1 | 3/2003 | Kondo et al. | |
| 2004/0030670 | A1 | 2/2004 | Barton | |
| 2004/0262063 | A1 | 12/2004 | Kaufmann et al. | |
| 2005/0273262 | A1 | 12/2005 | Kawakami et al. | |
| 2006/0200289 | A1 | 9/2006 | Chino et al. | |
| 2007/0027583 | A1 | 2/2007 | Tamir et al. | |
| 2007/0198145 | A1 * | 8/2007 | Norris | B60T 7/22 701/23 |
| 2008/0047775 | A1 | 2/2008 | Yamazaki | |
| 2009/0319060 | A1 | 12/2009 | Wojsznis et al. | |
| 2010/0152952 | A1 | 6/2010 | Lee et al. | |
| 2011/0055577 | A1 | 3/2011 | Candelore et al. | |
| 2012/0109465 | A1 | 5/2012 | Svensson et al. | |
| 2012/0109466 | A1 | 5/2012 | Svensson et al. | |
| 2012/0166032 | A1 | 6/2012 | Lee et al. | |
| 2013/0096778 | A1 | 4/2013 | Goto et al. | |
| 2015/0012182 | A1 | 1/2015 | Flehmig et al. | |
| 2015/0183460 | A1 | 7/2015 | Oyama | |
| 2015/0344029 | A1 | 12/2015 | Silvlin | |
| 2016/0207537 | A1 | 7/2016 | Urano et al. | |
| 2016/0229447 | A1 | 8/2016 | Wada et al. | |
| 2016/0272197 | A1 | 9/2016 | Hulten et al. | |
| 2016/0362102 | A1 | 12/2016 | Honda et al. | |
| 2016/0375911 | A1 | 12/2016 | Coelingh et al. | |
| 2017/0088174 | A1 * | 3/2017 | Inoue | B60T 8/1755 |
| 2017/0106903 | A1 | 4/2017 | Moretti et al. | |
| 2017/0225686 | A1 | 8/2017 | Takaso et al. | |
| 2017/0232997 | A1 | 8/2017 | Tsubaki et al. | |
| 2017/0282972 | A1 | 10/2017 | Moretti | |
| 2017/0291638 | A1 | 10/2017 | Gupta | |
| 2017/0297621 | A1 | 10/2017 | Bunderson et al. | |
| 2017/0355396 | A1 * | 12/2017 | Varunjikar | B62D 5/049 |
| 2018/0157221 | A1 | 6/2018 | Anderson | |
| 2018/0229769 | A1 | 8/2018 | Mardh et al. | |
| 2018/0265120 | A1 | 9/2018 | Mardh et al. | |
| 2018/0265123 | A1 | 9/2018 | Mardh et al. | |
| 2019/0241189 | A1 | 8/2019 | Odate | |

OTHER PUBLICATIONS

European Patent Office, Extended European Search Report for European Application No. 17161563.6-1755, dated Sep. 19, 2017, 5 pages.

European Patent Office, Extended European Search Report for European Application No. 17161795.4-1755, dated Sep. 20, 2017, 9 pages.

U.S. Patent and Trademark Office, Non-Final Office Action for U.S. Appl. No. 15/918,139, dated Jul. 30, 2019, 18 pages.

Extended European Search Report for EP 17161786.3, completed by the European Patent Office on Sep. 19, 2017, 9 pages.

U.S. Patent and Trademark Office, Notice of Allowance for U.S. Appl. No. 15/888,717, dated Sep. 23, 2019.

Mardh et al., Amendment Under 37 C.F.R. § 1.111 for U.S. Appl. No. 15/918,139, filed with the U.S. Patent and Trademark Office dated Nov. 22, 2019.

Mardh et al., Supplemental Response for U.S. Appl. No. 15/918,139, filed with the U.S. Patent and Trademark Office dated Nov. 23, 2019.

U.S. Patent and Trademark Office, Notice of Allowance for U.S. Appl. No. 15/918,139, dated Dec. 18, 2019.

U.S. Patent and Trademark Office, Notice of Allowance for U.S. Appl. No. 15/920,019, dated Jan. 15, 2020.

* cited by examiner

APPARATUS AND METHOD FOR DRIVER ACTIVITY DEPENDENT ADAS WHEEL ANGLE CONTROLLER

CROSS-REFERENCE TO RELATED APPLICATIONS

This application claims foreign priority benefits under 35 U.S.C. § 119(a)-(d) to European patent application number EP 17161786.3, filed Mar. 20, 2017, which is incorporated by reference in its entirety.

TECHNICAL FIELD

The present application relates to a steer torque manager for an advanced driver assistance system of a road vehicle having an electrical power assisted steering and a method in such a steer torque manager.

BACKGROUND

It is known to use power steering in road vehicles, e.g. electrical power assisted steering, commonly abbreviated as EPAS, in a road vehicle such as a car, lorry, bus or truck, wherein an electric motor assists a driver of the road vehicle by adding an assistive torque to e.g. a steering column or steering rack of the road vehicle.

It is further known to use advanced driver assistance systems, commonly abbreviated as ADAS, such as Lane Keeping Aid systems, commonly abbreviated as LKA systems, in order to help a road vehicle driver maintain the road vehicle in a desired lane. For LKA or lane centering systems where an EPAS is used, a steering wheel torque overlay, i.e. additional steering wheel torque on top of what would have been obtained by the base assist of the EPAS, is used for lateral position control.

However, the need for more advanced autonomous steering functions has put new requirements on current steering safety concepts. One example of such is commonly called Pilot Assist, commonly abbreviated as PA, which helps a driver to drive the vehicle within the road lane whilst at the same time maintaining a preselected time interval to a preceding vehicle.

Current safety mechanisms for driver assistance functions, such as PA functions, commonly rely on a driver to always hold his or her hands on the steering wheel. By holding the steering wheel, the comfort of the driver will be influenced by any torque disturbances in the steering system.

A Steer Torque Manager, commonly abbreviated as STM, is a component that includes a Driver In the Loop functionality, commonly abbreviated as DIL functionality, and a wheel angle controller. The DIL functionality usually relies on a torsion bar torque sensor to decide when and how to hand over control to the driver from the Pilot Assist- or Lane Keeping Aid-functionality and when the driver is to be treated as a disturbance that needs to be suppressed by the wheel angle controller. The DIL-functionality hands over control to the driver by limiting the torque output of the wheel angle controller, e.g. by scaling the output or by decreasing the maximum and minimum allowed overlay torque. The STM is commonly located in an EPAS supplier node, herein referred to as Power Steering Control Module, commonly abbreviated as PSCM.

Since a driver is required to keep his or her hands on the steering wheel the overall comfort and customer value of the PA functionality is largely decided by the STM, and in particular the wheel angle controller thereof. Advanced driver assistance systems, such as the above described Pilot Assist, adds a requirement of high bandwidth in the wheel angle controller in order for a PA path wheel angle request to be tracked accurately and not having a sluggish tracking performance of the PA path wheel angle request with the potential of causing car sickness, which a decreased bandwidth potentially would incur.

However, high bandwidth may result in pulsating torque sensations in the steering wheel, potentially causing discomfort to a driver holding on to the steering wheel.

Thus, the requirement of high bandwidth is contradictory because this requirement has the potential of causing discomfort to a driver by the resulting pulsating torque sensations in the steering wheel while a decrease in bandwidth when using advanced driver assistance systems, such as the above described Pilot Assist, has the potential of causing discomfort to a driver and other vehicle occupants by causing car sickness.

Thus, there is a need for improved solutions which are able to comfortably handle the above whilst facilitating fulfilment of high Automotive Safety Integrity requirements.

SUMMARY

Embodiments herein aim to provide an improved steer torque manager for an advanced driver assistance system of a road vehicle.

This is provided through a steer torque manager for an advanced driver assistance system of a road vehicle having an electrical power assisted steering, the steer torque manager comprising a driver in the loop functionality for determining when and how to hand over control from an advanced driver assistance system to a driver, a wheel angle controller for providing from an advanced driver assistance system wheel angle request an overlay torque request to be added to a torque request from the electrical power assisted steering, and the steer torque manager further being arranged to receive an assistance torque related signal, and where the steer torque manager further is arranged to scale, in a scaling functionality, the bandwidth of the wheel angle controller based on a measure of driver activity such that the bandwidth is reduced if the measure of driver activity indicates high driver activity, and increased if the measure of driver activity indicates low driver activity.

The provision of scaling the bandwidth of the wheel angle controller based on a measure of driver activity such that the bandwidth is reduced if the measure of driver activity indicates high driver activity, and increased if the measure of driver activity indicates low driver activity, as above, provides for using high bandwidth in the wheel angle controller in order for a Pilot Assist path wheel angle request to be tracked accurately and not having a sluggish tracking performance of the Pilot Assist path wheel angle request when using an advanced driver assistance system, such as a pilot assist system, and further allowing for use of a reduced bandwidth and thus a smoother, calmer and more comfortable steering and steering wheel feel when a driver is actively steering the road vehicle.

According to a second embodiment it is provided that the assistance torque related signal is provided as a vehicle traveling velocity dependent amplification of a steering wheel torsion bar torque.

The provision of the assistance torque related signal being provided as a vehicle traveling velocity dependent amplification of a steering wheel torsion bar torque provides for efficiently adapting the driver in the loop functionality to the vehicle traveling velocity.

According to a third embodiment it is provided that it further is arranged to use as the measure of driver activity a driver in the loop factor indicating driver activity from an inactive driver to a fully active driver.

The provision of using a driver in the loop factor, as above, is an efficient way to provide a measure of driver activity.

According to a fourth embodiment it is provided that it further is arranged to calculate the driver in the loop factor as a normalized version of a driver in the loop impulse, which it is arranged to calculate as a measure of driver activity over a time window where more recent values are weighted higher than older values, such that the driver in the loop factor spans between indicating an inactive driver and a fully active driver.

The provision of calculating the driver in the loop factor as above provides an efficient way of providing a useful indication of driver steering activity.

According to a fifth embodiment it is provided that the driver in the loop factor is arranged to span from 1 to 0 where 1 indicates an inactive driver and 0 indicates a fully active driver for whom the overlay torque request from an advanced driver assist functionality should be faded out and control handed over from an advanced driver assistance system to a driver.

The provision of arranging the driver in the loop factor to span from 1 to 0 as above provides an intuitive measure for indication of driver steering activity.

According to a sixth embodiment it is provided that the driver in the loop factor is rate limited.

The provision of rate limiting the driver in the loop factor provides for further avoiding uncomfortable jerks in the steering wheel of an associated road vehicle.

According to a seventh embodiment it is provided that the wheel angle controller comprises integral action in order to eliminate offset in the overlay torque request based on wheel angle and wheel angle rate data and that the scaling functionality is arranged to scale the bandwidth of the wheel angle controller through scaling gains of wheel angle and wheel angle rate data in the wheel angle controller based on the measure of driver activity and a vehicle traveling velocity signal.

The provision of scaling the bandwidth of the wheel angle controller through scaling gains of wheel angle and wheel angle rate data, as above, provides for enabling a smooth comfortable feeling for a driver of the road vehicle whether using an advanced driver assistance system or steering manually.

According to an eight embodiment it is provided that the wheel angle controller comprises an outer wheel angle control loop and an inner wheel angle rate control loop and that the scaling functionality is arranged to scale the bandwidth of the outer wheel angle control loop using a first scale table and the bandwidth of the inner wheel angle rate control loop using a second scale table, and based on the measure of driver activity and a vehicle traveling velocity signal.

The provision of using first and second scale tables, as above, provides an efficient way to administer the scaling of the bandwidth.

According to a ninth embodiment it is provided that the first scale table is used to generate a first scale factor to scale the bandwidth of the outer wheel angle control loop proportionately to an immediate control error thereof and that the second scale table is used to generate a second scale factor to scale the bandwidth of the inner wheel angle rate control loop to an integrated control error thereof over time.

The provision of scaling the bandwidth of the outer wheel angle and the inner wheel angle rate control loops, as above, provides for efficiently adapting the smoothness and accuracy of the steering to driver steering activity.

According to a tenth embodiment is provided a power steering control module that comprises a steer torque manager as above.

The provision of a power steering control module that comprises a steer torque manager as above provides for using high bandwidth in the wheel angle controller in order for a Pilot Assist path wheel angle request to be tracked accurately and not having a sluggish tracking performance of the Pilot Assist path wheel angle request when using an advanced driver assistance system, such as a pilot assist system, and further allowing for use of a reduced bandwidth and thus a smoother, calmer and more comfortable steering and steering wheel feel when a driver is actively steering the road vehicle.

According to an eleventh embodiment is provided an advanced driver assistance system that comprises a steer torque manager as above.

The provision of an advanced driver assistance system that comprises a steer torque manager as above provides for using high bandwidth in the wheel angle controller in order for a Pilot Assist path wheel angle request to be tracked accurately and not having a sluggish tracking performance of the Pilot Assist path wheel angle request when using an advanced driver assistance system, such as a pilot assist system, and further allowing use of a reduced bandwidth and thus a smoother, calmer and more comfortable steering and steering wheel feel when a driver is actively steering the road vehicle.

According to a twelfth embodiment is provided a road vehicle that comprises an advanced driver assistance system as above.

The provision of a road vehicle that comprises an advanced driver assistance system as above provides for improved driver comfort when using an advanced driver assistance system, such as a pilot assist system.

According to a thirteenth embodiment is provided a method in a steer torque manager for an advanced driver assistance system of a road vehicle having an electrical power assisted steering, the steer torque manager comprising a driver in the loop functionality for determining when and how to hand over control from an advanced driver assistance system to a driver, a wheel angle controller for providing from an advanced driver assistance system wheel angle request an overlay torque request to be added to a torque request from the electrical power assisted steering, and the steer torque manager further being arranged to receive an assistance torque related signal, where the method comprises: scaling the bandwidth of the wheel angle controller based on a measure of driver activity such that the bandwidth is reduced if the measure of driver activity indicates high driver activity, and increased if the measure of driver activity indicates low driver activity.

A method as above provides for using high bandwidth in the wheel angle controller in order for a Pilot Assist path wheel angle request to be tracked accurately and not having a sluggish tracking performance of the Pilot Assist path wheel angle request when using an advanced driver assistance system, such as a pilot assist system, and further allowing for use of a reduced bandwidth and thus a smoother, calmer and more comfortable steering and steering wheel feel when a driver is actively steering the road vehicle.

BRIEF DESCRIPTION OF THE DRAWINGS

In the following, embodiments herein will be described in greater detail by way of example only with reference to attached drawings, in which.

Figure 1:
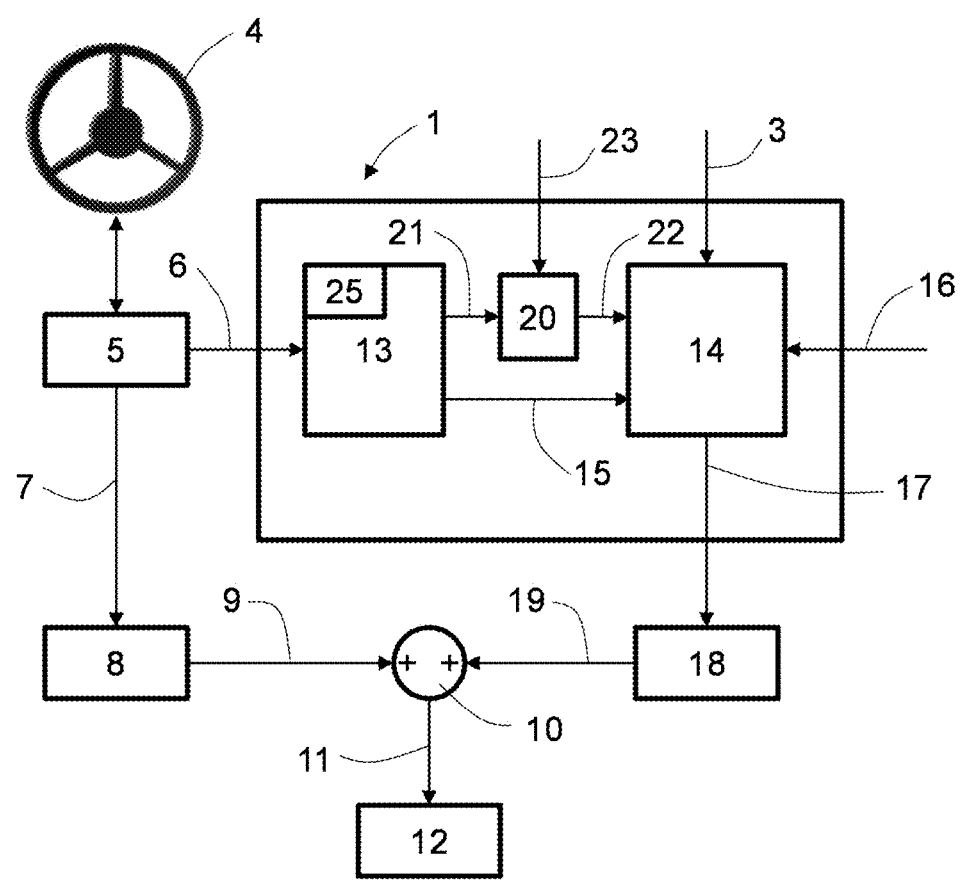
FIG. 1 is a schematic illustration of a steer torque manager for an advanced driver assistance system arranged in an electrical power assisted steering system of a road vehicle.

Still other features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

This disclosure is based on the realization that it should be possible to provide an improved steer torque manager 1 for an advanced driver assistance system 26 of a road vehicle 2, which is able to track a pinion angle request/wheel angle request 3 from an advanced driver assistance system path accurately with expedient performance whilst allowing for a smoother, calmer and thus more comfortable steering and steering wheel 4 feel when a driver is actively steering the road vehicle 2. In the following the term wheel angle request will be used, however the skilled person will readily equate it with the term pinion angle request for the understanding of the following description.

This is, as illustrated in FIG. 1, provided through a steer torque manager 1, as described in the following, for an advanced driver assistance system 26 of a road vehicle 2 having an electrical power assisted steering (EPAS).

FIG. 1 illustrates schematically such a steer torque manager 1, where a steering wheel 4 torque applied by a driver of the road vehicle 2, and sensed by a steering wheel torque sensor 29, is used by an electrical power assisted steering (EPAS) assistance functionality 5 arranged to provide a steering wheel 4 torsion bar 28 torque related signal 6, representative of an assistance torque or basic steering torque (BST), and an assistance torque request 7. This assistance torque request 7 is normally identified as a QM hazard which does not dictate any safety requirements according to the Automotive Safety Integrity Level (ASIL) risk classification scheme defined by the ISO 26262—Functional Safety for Road Vehicles standard.

The assistance torque request 7 is subject to an assistance torque safety limiter 8 which in turn provide a safety limited assistance torque request 9 that fulfil Automotive Safety Integrity Level D, which is the highest classification of initial hazard (injury risk) defined within ISO 26262 and to that standard's most stringent level of safety measures to apply for avoiding an unreasonable residual risk.

This ASIL D compliant safety limited assistance torque request 9 is then brought to a summation point 10, which in turn provides a total torque request 11 to a motor controller 12 of a steering system 30 of the road vehicle 2.

The steer torque manager 1 comprises a driver in the loop functionality 13, to which driver in the loop functionality 13 the steering wheel 4 torsion bar 28 torque related signal 6, sometimes also referred to as basic steering torque (BST) signal, is provided. The driver in the loop functionality 13 uses this steering wheel 4 torsion bar 28 torque related signal 6 for determining when and how to hand over control from an advanced driver assistance system 26 to a driver.

The steer torque manager 1 also comprises a wheel angle controller 14, for providing from an advanced driver assistance system 26 wheel angle request 3 and torque limits 15, upper and lower, from the driver in the loop functionality 13, and usually also from wheel angle and wheel angle rate data 16, an overlay torque request 17.

The steer torque manager 1 is further arranged to scale, in a scaling functionality 20, the bandwidth of the wheel angle controller 14 based on a measure of driver activity 21 such that the bandwidth is reduced if the measure of driver activity 21 indicates high driver activity, and increased if the measure of driver activity 21 indicates low driver activity.

The resulting overlay torque request 17 is also identified as a QM hazard which does not dictate any safety requirements, why it is also subject to an overlay torque safety limiter 18 which in turn provide a safety limited overlay torque request 19 that fulfil Automotive Safety Integrity Level D.

The safety limited overlay torque request 19 is then arranged to be added to the ASIL D compliant safety limited assistance torque request 9 from the electrical power assisted steering 5 at the summation point 10, which in turn provides a total torque request 11 to the motor controller 12 of the steering system 30 of the road vehicle 2.

Thus, through scaling the bandwidth of the wheel angle controller 14 based on a measure of driver activity 21, as described above, it is possible to provide for allowing the use of a high bandwidth in the wheel angle controller 14 in order for an advanced driver assistance system 26 path wheel angle request 3 to be tracked accurately and without a sluggish tracking performance of the advanced driver assistance system 26 path wheel angle request 3 when using an advanced driver assistance system 26, such as e.g. a pilot assist system. This further allows for use of a reduced bandwidth and thus a smoother, calmer and more comfortable steering and steering wheel 4 feel when a driver is actively steering the road vehicle 2.

According to embodiments hereof the assistance torque related signal 6 is provided as a vehicle 2 traveling velocity dependent amplification of a steering wheel 4 torsion bar 28 torque. This provides for efficiently adapting the driver in the loop functionality to the vehicle traveling velocity.

In yet further embodiments the steer torque manager 1 is further arranged to use as the measure of driver activity 21 a driver in the loop factor indicating driver activity from an inactive driver to a fully active driver, which is an efficient way to provide a measure of driver activity 21 when the steer torque manager 1 comprises a driver in the loop functionality 13.

According to still some embodiments the steer torque manager 1 is further arranged to calculate, using a calculating functionality thereof 25, the driver in the loop factor 21 as a normalized version of a driver in the loop impulse. The steer torque manager 1 is arranged to calculate the driver in the loop impulse as a measure of driver activity over a time window where more recent values are weighted higher than older values, such that the driver in the loop factor 21 spans between indicating an inactive driver and a fully active driver. This is an efficient way of providing a useful indication of driver steering activity that is readily available to the scaling functionality 20.

In some such embodiments the driver in the loop factor 21 is arranged to span from 1 to 0 where 1 indicates an inactive driver and 0 indicates a fully active driver, for whom the overlay torque request 17 generated from an advanced driver assist functionality 26 wheel angle request 3 should be faded out and control handed over from an advanced driver assistance system 26 to a driver. Having the driver in the loop factor 21 to span from 1 to 0 as described above provides an intuitive and useful measure for indication of driver steering activity.

In yet some embodiments the driver in the loop factor 21 is rate limited, which provides for further avoiding uncomfortable jerks in the steering wheel 4 of the associated road vehicle 2 that is suitable to be used by the scaling functionality 20.

In yet some embodiments the wheel angle controller 14 comprises integral action in order to eliminate offset in the overlay torque request 3 based on wheel angle and wheel angle rate data 16 and the scaling functionality 20 is arranged to scale the bandwidth of the wheel angle controller 14 through scaling gains of wheel angle and wheel angle rate data 16 in the wheel angle controller 14 based on the measure of driver activity 21 and a vehicle traveling velocity signal 23.

Thus, as described above, through scaling the bandwidth of the wheel angle controller 14 through scaling gains of wheel angle and wheel angle rate data 16 in the wheel angle controller 14 based on the measure of driver activity 21 and a vehicle traveling velocity signal 23, it is possible to provide an improved steer torque manager 1 for an advanced driver assistance system 26 of a road vehicle 2, which is able to track a wheel angle request 3 from an advanced driver assistance system path accurately and without a sluggish tracking performance when using an advanced driver assistance system 26, such as e.g. a pilot assist system. This further allows for use of a reduced bandwidth and thus a smoother, calmer and more comfortable steering and steering wheel 4 feel when a driver is actively steering the road vehicle 2, whilst at the same time facilitating fulfilment of high Automotive Safety Integrity requirements.

Figure 2:
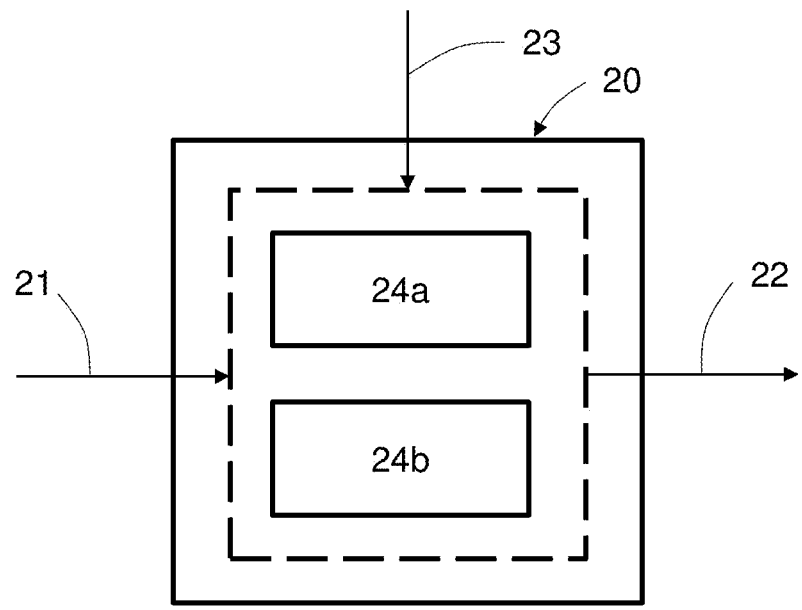
FIG. 2 is a schematic illustration in more detail of a scaling functionality of the steer torque manager of FIG. 1.

In still some further embodiments the wheel angle controller 14 comprises an outer wheel angle control loop and an inner wheel angle rate control loop and the scaling functionality 20 is, as illustrated in FIG. 2, arranged to scale the bandwidth of the outer wheel angle control loop using a first scale table 24a and the bandwidth of the inner wheel angle rate control loop using a second scale table 24b, and based on the measure of driver activity 21 and a vehicle traveling velocity signal 23.

In some such embodiments the first scale table 24a is used to generate a first scale factor to scale the bandwidth of the outer wheel angle control loop proportionately to an immediate control error thereof and that the second scale table 24b is used to generate a second scale factor to scale the bandwidth of the inner wheel angle rate control loop to an integrated control error thereof over time.

Figure 4:
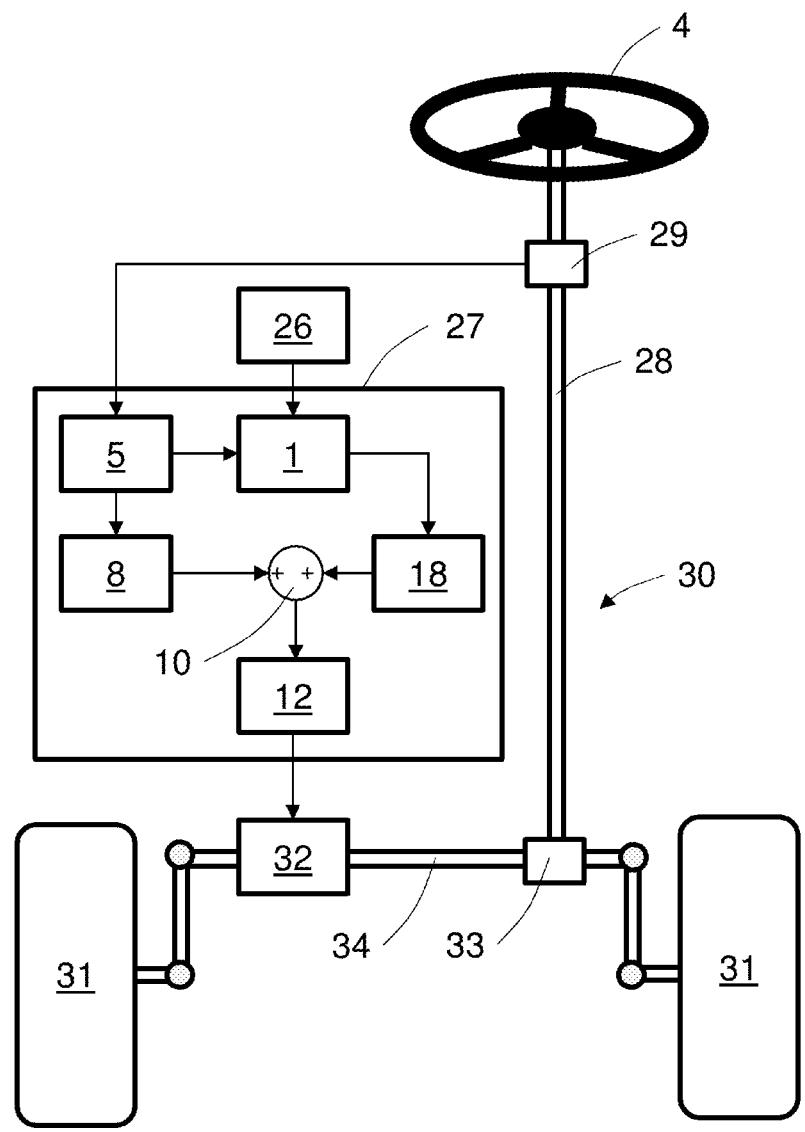
FIG. 4 is a schematic illustration of a vehicle steering system having a power steering control module that comprises a steer torque manager according to embodiments herein.

As illustrated schematically in FIG. 4, it is further envisaged herein a power steering control module 27 that comprises a steer torque manager 1 as above. The steering system 30 of the vehicle 2 comprises a steering wheel 4, connected to a steering rack 34 via a torsion bar 28, to which a steering wheel torque sensor 29 is arranged, and a pinion gear 33. The power steering control module 27 comprises the steer torque manager 1, which is arranged to control the overlay torque motor 32 of the steering system 30 of the road vehicle 2 to provide an overlay torque to steerable wheels 31 of the vehicle 1 steering system 30.

A power steering control module 27 that comprises a steer torque manager 1 as above provides for a smoother, calmer and thus more comfortable steering and steering wheel 4 feel when a driver is actively steering the road vehicle 2. Thus is provided for improved driver comfort when using an advanced driver assistance system 26, such as a pilot assist system.

Figure 5:
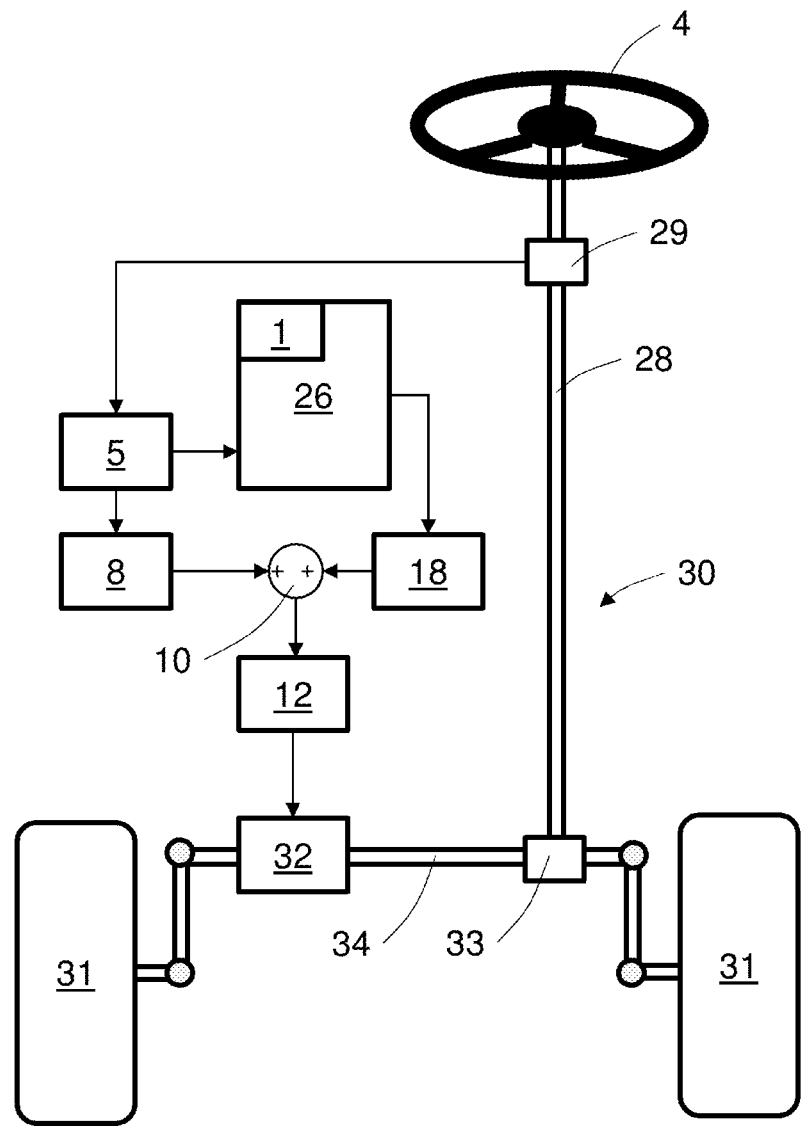
FIG. 5 is a schematic illustration of a vehicle steering system having an advanced driver assistance system that comprises a steer torque manager according to embodiments herein.

It is still further envisaged herein, as illustrated schematically in FIG. 5, an advanced driver assistance system 26 that comprises a steer torque manager 1 as above. As for FIG. 4, the steering system 30 of the vehicle 2 comprises a steering wheel 4, connected to a steering rack 34 via a torsion bar 28, to which a steering wheel torque sensor 29 is arranged, and a pinion gear 33.

An advanced driver assistance system 26 that comprises a steer torque manager 1 as described above provides for a smoother, calmer and thus more comfortable steering and steering wheel 4 feel when a driver is actively steering the road vehicle 2. Thus is provided for improved driver comfort when using an advanced driver assistance system 26, such as a pilot assist system.

Figure 3:
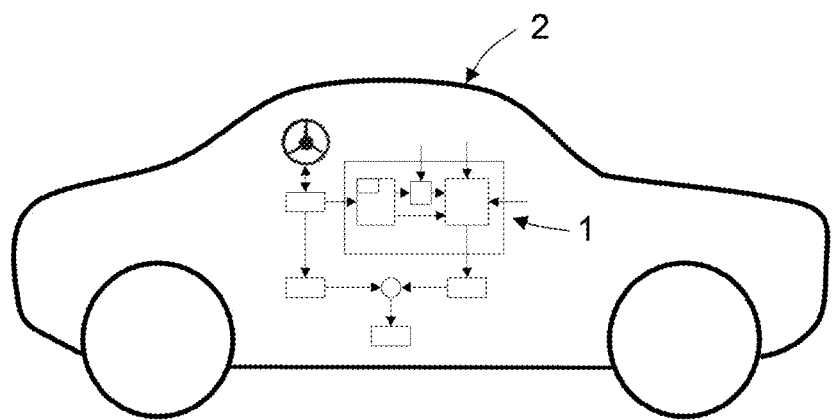
FIG. 3 is a schematic illustration of a road vehicle comprising the steer torque manager of FIG. 1 arranged in an electrical power assisted steering system thereof.

Still further envisaged herein is a road vehicle 2, as illustrated in FIG. 3, which has an advanced driver assistance system that comprises a steer torque manager 1, as described above. A road vehicle 2 that has an advanced driver assistance system that comprises a steer torque manager 1, as described above, provides for improved driver comfort when using an advanced driver assistance system 26, such as a pilot assist system.

In accordance with the present application is also envisaged a method in a steer torque manager 1 for an advanced driver assistance system 26 of a road vehicle 2 having an electrical power assisted steering. The steer torque manager 1 comprises a driver in the loop functionality 13 for determining when and how to hand over control from an advanced driver assistance system 26 to a driver of the road vehicle 2. The steer torque manager 1 further comprises a wheel angle controller 14, for providing from an advanced driver assistance system 26 wheel angle request 3 an overlay torque request 17 to be added to a torque request 7 from the electrical power assisted steering. The steer torque manager 1 is further arranged to receive a steering wheel 4 torsion bar 28 torque related signal 6, here also referred to as an assistance torque related signal 6. The method, as schematically illustrated in FIG. 6, comprises scaling the bandwidth of the wheel angle controller 14 based on a measure of driver activity 21 such that the bandwidth is reduced if the measure of driver activity 21 indicates high driver activity, and increased if the measure of driver activity 21 indicates low driver activity.

Figure 6:
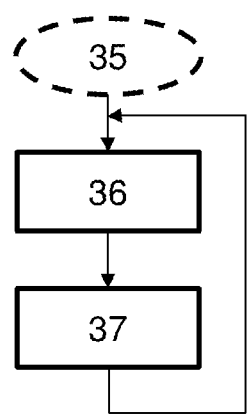
FIG. 6 is a schematic illustration of a method in a steer torque manager according to embodiments herein.

As schematically illustrated in FIG. 6 the method starts out at 35, next is scaled the bandwidth of the wheel angle controller 14 based on a measure of driver activity 21. Scaling is done such that such that controller parameters, such as e.g. gains of wheel angle and wheel angle rate data 16 are scaled at 36, and then brought to the wheel angle controller 14 to be used for generating the overlay torque request 17 at 37, whereupon the method loops back to start at 35. Scaling of the controller parameters is performed such that the bandwidth of the wheel angle controller 14 is reduced if the measure of driver activity 21 indicates high driver activity, and such that the bandwidth of the wheel angle controller 14 increased if the measure of driver activity 21 indicates low driver activity.

The overlay torque request 17 may be subject to an overlay torque safety limiter 18 in order to provide a safety limited overlay torque request 19, which is then arranged to be added to an ASIL D compliant safety limited assistance torque request 9 from the electrical power assisted steering 5 in order to provide the total torque request 11 to the motor controller 12 of the steering system 30 of the road vehicle 2.

Thus, the above method provides for allowing an inactive driver of an associated road vehicle 2, for which driver assistance is provided by an advanced driver assistance system 26, to comfortably rest his or her hands on a steering wheel 4 thereof.

Using the method allows for use of a reduced bandwidth and thus a smoother, calmer and more comfortable steering and steering wheel 4 feel when a driver is actively steering the road vehicle. Thus the method provides for improved driver comfort when using an advanced driver assistance system 26, such as a pilot assist system.

The method also provides for using high bandwidth in the wheel angle controller 14 in order for an advanced driver assistance system 26 path wheel angle request 3 to be tracked accurately and not having a sluggish tracking performance when using an advanced driver assistance system 26, such as a pilot assist system.

The above-described embodiments may be varied within the scope of the following claims.

It should be noted that the steering torque manager 1, the advanced driver assistance system 26, the electrical power assisted steering functionality 5, the assistance torque safety limiter 8, the motor controller 12, the steering system 30, the driver in the loop functionality 13, the wheel angle controller 14, scaling functionality 20, overlay torque safety limiter 18, the calculating functionality 25, the power steering control module 27, the wheel torque sensor 29, the overlay torque motor 32, as well as any other device, unit, feature, manager, system, functionality, action, limiter, sensor, motor, controller, filter, module, arrangement, or the like described herein may comprise and/or be implemented in or by one or more appropriately programmed processors (e.g., one or more microprocessors including central processing units (CPU)) and associated memory and/or storage, which may include data (e.g., scale tables 24a, 24b), operating system software, application software and/or any other suitable program, code or instructions executable by the processor(s) for controlling operation thereof, for providing and/or controlling interaction and/or cooperation between the various features and/or components described herein, and/or for performing the particular algorithms represented by the various functions and/or operations described herein.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A steer torque manager for an advanced driver assistance system of a road vehicle having an electrical power assisted steering functionality, the steer torque manager comprising:
    a driver-in-the-loop functionality for determining when and how to hand over control from the advanced driver assistance system to a driver; and
    a wheel angle controller for providing, from an advanced driver assistance system wheel angle request, an overlay torque request to be added to a torque request from the electrical power assisted steering functionality;
    wherein the steer torque manager is configured to receive an assistance torque related signal, and wherein the steer torque manager is further configured to scale, in a scaling functionality, a bandwidth of the wheel angle controller based on a measure of driver activity wherein the bandwidth is reduced in response to the measure of driver activity indicating high driver activity, and wherein the bandwidth is increased in response to the measure of driver activity indicating low driver activity that is lower than the high driver activity;
    wherein the assistance torque related signal is provided as a vehicle traveling velocity dependent amplification of a steering wheel torsion bar torque.

2. The steer torque manager of claim 1 wherein the steer torque manager is further configured to use as the measure of driver activity a driver in the loop factor indicating driver activity from an inactive driver to a fully active driver.

3. The steer torque manager of claim 2 wherein the steer torque manager is further configured to calculate the driver in the loop factor as a normalized version of a driver in the loop impulse, which the steer torque manager is configured to calculate as a measure of driver activity over a time window where more recent values are weighted higher than older values, wherein the driver in the loop factor spans between indicating an inactive driver and a fully active driver.

4. The steer torque manager of claim 2 wherein the driver in the loop factor is arranged to span from 1 to 0 where 1 indicates an inactive driver and 0 indicates a fully active driver for whom the overlay torque request from an advanced driver assist functionality should be faded out and control handed over from an advanced driver assistance system to a driver.

5. The steer torque manager of claim 2 wherein the driver in the loop factor is rate limited.

6. The steer torque manager of claim 1 wherein the wheel angle controller comprises integral action in order to eliminate offset in the overlay torque request based on wheel angle and wheel angle rate data and the scaling functionality is arranged to scale the bandwidth of the wheel angle controller through scaling gains of wheel angle and wheel angle rate data in the wheel angle controller based on the measure of driver activity and a vehicle traveling velocity signal.

7. The steer torque manager of claim 6 wherein the wheel angle controller comprises an outer wheel angle control loop and an inner wheel angle rate control loop and the scaling functionality is arranged to scale the bandwidth of the outer wheel angle control loop using a first scale table and the bandwidth of the inner wheel angle rate control loop using a second scale table, and based on the measure of driver activity and a vehicle traveling velocity signal.

8. The steer torque manager of claim 7 wherein the first scale table is used to generate a first scale factor to scale the bandwidth of the outer wheel angle control loop proportionately to an immediate control error thereof and the second scale table is used to generate a second scale factor to scale the bandwidth of the inner wheel angle rate control loop to an integrated control error thereof over time.

9. A power steering control module comprising a steer torque manager according to claim 1.

10. An advanced driver assistance system comprising a steer torque manager according to claim 1.

11. A road vehicle comprising an advanced driver assistance system according to claim 10.

12. A method performed by a steer torque manager for an advanced driver assistance system of a road vehicle having an electrical power assisted steering functionality, the steer torque manager comprising a driver-in-the-loop functionality for determining when and how to hand over control from the advanced driver assistance system to a driver, a wheel angle controller for providing, from an advanced driver assistance system wheel angle request, an overlay torque request to be added to a torque request from the electrical power assisted steering functionality, the steer torque manager configured to receive an assistance torque related signal, the method comprising:
  scaling a bandwidth of the wheel angle controller based on a measure of driver activity wherein the bandwidth is reduced in response to the measure of driver activity indicating high driver activity, and wherein the bandwidth is increased in response to the measure of driver activity indicating low driver activity that is lower than the high driver activity, wherein the assistance torque related signal is provided as a vehicle traveling velocity dependent amplification of a steering wheel torsion bar torque.

13. A steer torque manager for an advanced driver assistance system of a road vehicle having an electrical power assisted steering functionality, the steer torque manager comprising:
  a driver-in-the-loop functionality for determining when and how to hand over control from the advanced driver assistance system to a driver; and
  a wheel angle controller for providing, from an advanced driver assistance system wheel angle request, an overlay torque request to be added to a torque request from the electrical power assisted steering functionality;
  wherein the steer torque manager is configured to receive an assistance torque related signal, and wherein the steer torque manager is further configured to scale, in a scaling functionality, a bandwidth of the wheel angle controller based on a measure of driver activity wherein the bandwidth is reduced in response to the measure of driver activity indicating a first driver activity, and wherein the bandwidth is increased in response to the measure of driver activity indicating second driver activity that is less than the first driver activity, wherein the assistance torque related signal is provided as a vehicle traveling velocity dependent amplification of a steering wheel torsion bar torque.

14. The steer torque manager of claim 1 wherein the assistance torque related signal is provided as a vehicle traveling velocity dependent amplification of a steering wheel torsion bar torque.

15. The steer torque manager of claim 1 wherein the steer torque manager is further configured to use as the measure of driver activity a driver in the loop factor indicating driver activity from an inactive driver to a fully active driver.

16. The steer torque manager of claim 15 wherein the steer torque manager is further configured to calculate the driver in the loop factor as a normalized version of a driver in the loop impulse, which the steer torque manager is configured to calculate as a measure of driver activity over a time window where more recent values are weighted higher than older values, wherein the driver in the loop factor spans between indicating an inactive driver and a fully active driver.

17. The steer torque manager of claim 15 wherein the driver in the loop factor is arranged to span from 1 to 0 where 1 indicates an inactive driver and 0 indicates a fully active driver for whom the overlay torque request from an advanced driver assist functionality should be faded out and control handed over from an advanced driver assistance system to a driver.

18. The steer torque manager of claim 15 wherein the driver in the loop factor is rate limited.

19. The steer torque manager of claim 13 wherein the wheel angle controller comprises integral action in order to eliminate offset in the overlay torque request based on wheel angle and wheel angle rate data and the scaling functionality is arranged to scale the bandwidth of the wheel angle controller through scaling gains of wheel angle and wheel angle rate data in the wheel angle controller based on the measure of driver activity and a vehicle traveling velocity signal.

* * * * *